No. 627,351. Patented June 20, 1899.
J. C. RAYMOND.
BICYCLE.
(Application filed Nov. 4, 1897.)
(No Model.) 2 Sheets—Sheet 1.
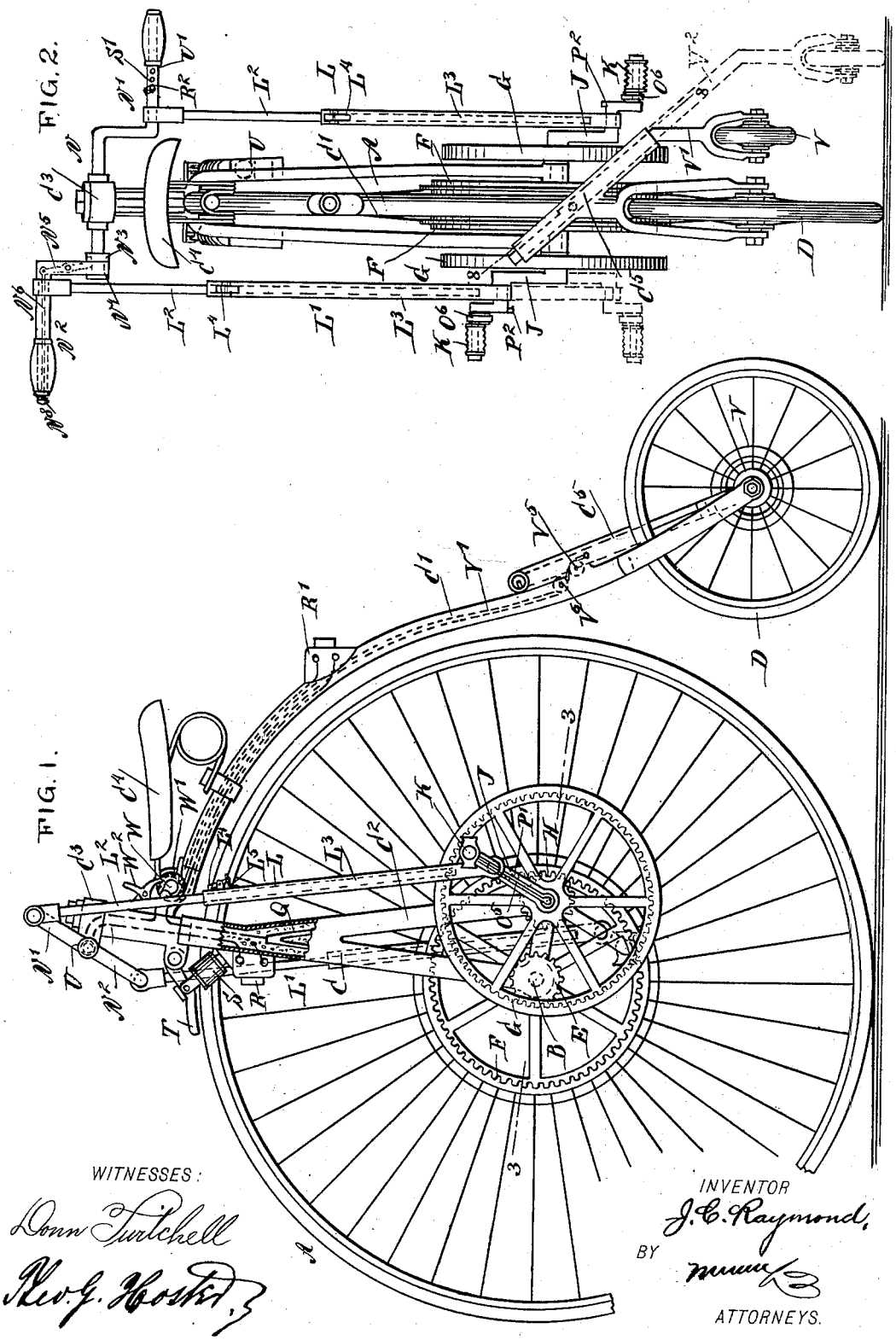
WITNESSES:
INVENTOR
J. C. Raymond,
BY
ATTORNEYS.

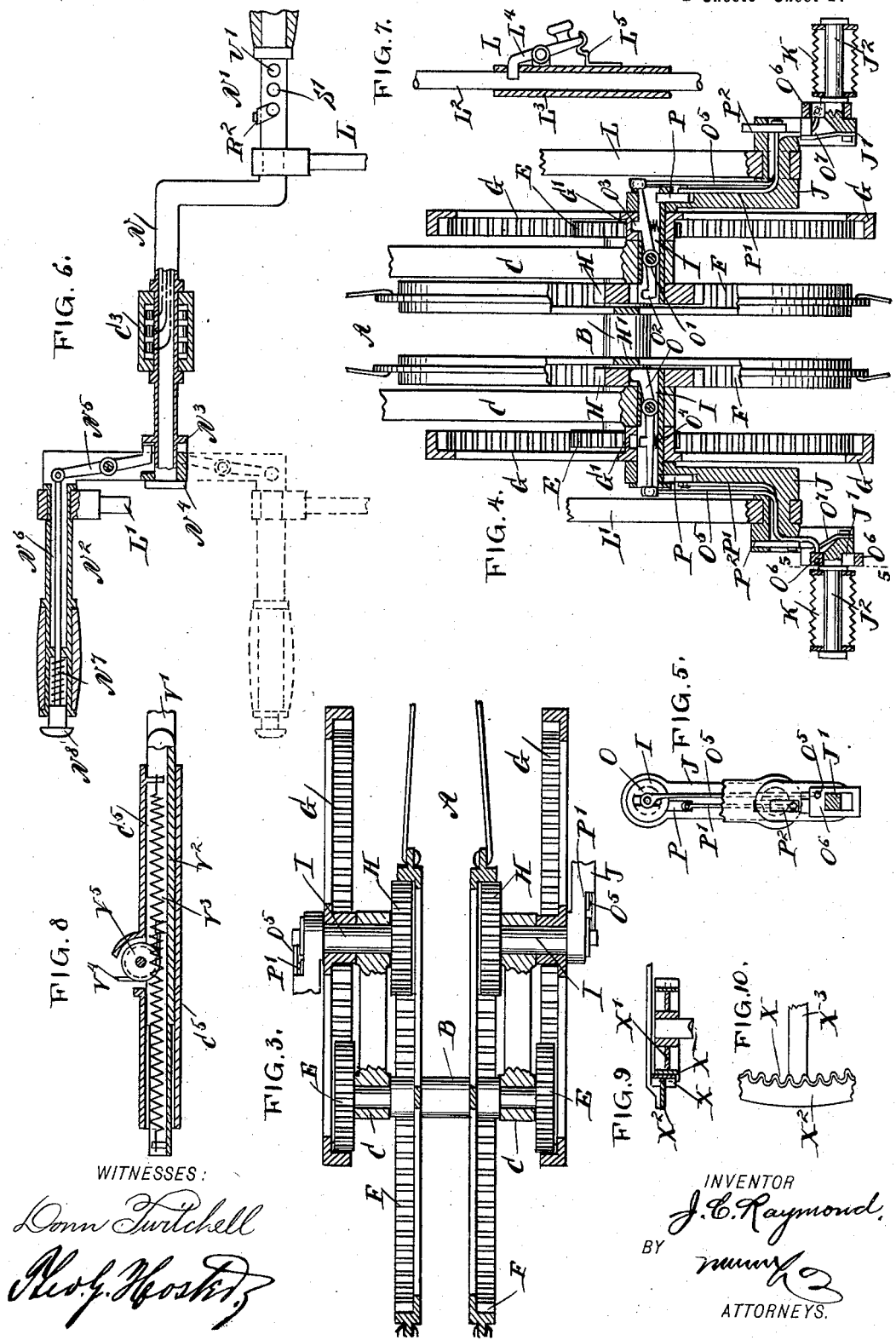

UNITED STATES PATENT OFFICE.

JOHN CARLYLE RAYMOND, OF NEW YORK, N. Y.

BICYCLE.

SPECIFICATION forming part of Letters Patent No. 627,351, dated June 20, 1899.

Application filed November 4, 1897. Serial No. 657,361. (No model.)

*To all whom it may concern:*

Be it known that I, JOHN CARLYLE RAYMOND, of New York, (Brooklyn,) in the county of Kings and State of New York, have invented a new and Improved Bicycle, of which the following is a full, clear, and exact description.

The invention relates to bicycles such as shown and described in the Letters Patent of the United States No. 592,169, granted to me October 19, 1897.

The object of the present invention is to provide a new and improved bicycle arranged to permit a rider to conveniently change the gearing from a high speed to a low speed, or vice versa, and manipulate the bell and brake by means of electricity and to insure against being run into during the night by displaying a danger-signal from the rear.

The invention consists of novel features and parts and combinations of the same, as hereinafter more fully described, and pointed out in the claims.

Reference is to be had to the accompanying drawings, forming a part of this specification, in which similar characters of reference indicate corresponding parts in all the figures.

Figure 1 is a side elevation of the improvement with parts broken out. Fig. 2 is a rear end elevation of the same. Fig. 3 is an enlarged sectional plan view of the gearing on the line 3 3 of Fig. 1. Fig. 4 is a transverse section of the same. Fig. 5 is a sectional side elevation of part of the same on the line 5 5 of Fig. 4. Fig. 6 is an enlarged transverse section of the handle-bar. Fig. 7 is an enlarged sectional side elevation of the locking device for the sectional link. Fig. 8 is an enlarged transverse section of part of the bicycle-support, the section being taken on the line 8 8 of Fig. 2. Fig. 9 is a sectional plan view of a modified form of gear-wheel, and Fig. 10 is a side elevation of the modified form of the gear-wheel shown in Fig. 9.

The improved bicycle is provided with a large drive-wheel A, having its axle B journaled in suitable bearings in a fork C, provided with a rearward extension C', carrying a guide-wheel D. On the ends of the axle B, outside of the fork C, are secured pinions E, and on the hub of the wheel A are formed or secured internal gear-wheels F. The said pinions are in mesh with internal gear-wheels G and the internal gear-wheels F are in mesh with pinions H.

The internal gear-wheel G and the pinion H on each side of the machine are mounted to rotate loosely on a hollow shaft I, journaled in suitable bearings formed in an extension $C^2$ of the fork C, the said internal gear-wheels G and the pinions H being adapted to be locked to the said shafts I, as hereinafter more fully described. Normally, however, the internal gear-wheels G are locked to the shaft I, as indicated at the right in Fig. 4, while the pinions H rotate loosely on the shaft, but the condition may be reversed, as shown at the left in Fig. 4, so that the internal gear-wheels rotate loosely on the shaft I, while the pinions H are locked to the shaft.

Now it is evident that when the shaft I is rotated and the internal gear-wheels G are locked thereto then a rotary motion is transmitted by the gear-wheels G to the pinions E to rotate the axle B and the drive-wheel A at a high rate of speed, and when the pinions H are locked to the shafts I and the internal gear-wheels G rotate loosely thereon, then the rotary motion given to the said shafts I is transmitted by the pinions H to the internal gear-wheels F to rotate the drive-wheel A at a slow powerful rate of speed.

Rotary motion is given to the shafts I by crank-arms J, normally locked to the said shafts, but adapted to be unlocked therefrom when the rider desires to coast, as hereinafter more fully described, and on the said crank-arms are held pedals K, engaged by the feet of the rider seated on a seat $C^4$, carried by the frame or extension C' of the bicycle. The crank-arms J are also pivotally connected by links L L' with the crank-arms $N' N^2$, respectively, of a handle-bar N, mounted to turn in a head $C^3$, carried on the upper end of the fork C, as is plainly shown in Fig. 6.

Now when either the set of gear-wheels G or the set of pinions H is locked to the shaft I and the crank-arms J are locked to the said shaft I then the operator can turn the crank-arms by using his feet on the pedals as well as by turning the handle-bar N with his hands. The rotary motion given to the shafts I is transmitted by either the set of gear-wheels G or the set of pinions H to the drive-wheel A in the manner above described, it being understood that the operator in doing so uses both his hands and feet.

The device for locking the internal gear-wheel G and the pinion H to the corresponding shaft I consists of a lever O, arranged within a hollow shaft I and fulcrumed therein at O' and formed with lugs $O^2$ and $O^3$, projecting from the lever at opposite sides of its fulcrum O'. The lugs $O^2$ and $O^3$ are adapted to engage recesses H' and G', respectively, formed in the pinion H and the internal gear-wheel G, respectively, a spring $O^4$ pressing on the forward end of the said lever to normally hold the lug $O^3$ in engagement with the recess G' and the lug $O^2$ out of engagement with its recess H', as indicated at the right in Fig. 4. Each lever O extends slightly beyond the outer end of the corresponding shaft I and is at its outer end loosely connected with a rod $O^5$, extending downwardly along the crank-arm J to connect with a slide $O^6$, fitted to slide vertically on the square offset of a bearing J', formed on the inner end of a pivot or stud $J^2$ for the corresponding pedal K. The slide $O^6$ is pressed on by a spring-catch $O^7$ to firmly hold the said slide in an uppermost position; but when it is desired to change from a high speed to a low speed, as previously explained, then the operator presses with his feet on the upper end of the slide $O^6$ to force the same downward and to exert a pull on the rods $O^5$ to impart a swinging motion to the levers O, so that the lugs $O^3$ move out of mesh with the recesses G' in the internal gear-wheels G and the other lugs $O^2$ move into mesh with the recesses H' in the pinions H. The latter now become the transmitters of the power, and the internal gear-wheels rotate loosely on the shafts I. When the slide $O^6$ is pushed downward into a lowermost position, as described and shown in Fig. 4, it is locked therein by a spring-catch $O^7$, engaging the top of the slide, as is plainly shown at the left in Fig. 4. When it is desired to return to the former speed, the operator simply pushes the spring-catches $O^7$ out of engagement with the slides $O^6$ to allow the springs $O^4$ to return the levers O and the parts connected therewith to their former position. (Shown at the right in Fig. 4.) When the lever O is in the position at the left in Fig. 4, then the outer end thereof is in the axis of the shaft I to permit the rod $O^5$ to turn on the outer end of the lever O when the corresponding arm J is unlocked from the shaft I at the time the operator is coasting.

In the device for locking each crank-arm J to its corresponding hollow shaft I, I provide a bolt P, fitted to slide in a suitable bearing on the said crank-arm to engage an aperture in the wall of the said shaft, as is plainly indicated at the right in Fig. 4. The bolt P is pivotally connected with a rod P', extending along the crank-arm J to connect with a slide $P^2$, fitted to slide in the lower portion of the said crank-arm outside of the link L, so that the operator can place his feet on the projecting upper end of the said slide $P^2$ and press the slide downward to move the bolt P out of engagement with the shaft I. When this takes place, as shown at the left in Fig. 4, the arm J is uncoupled from the shaft I and the rider can keep the pedals K and crank-arms J stationary for coasting purposes.

The links L and L' are preferably made in sections to permit of setting the links out of action whenever the operator desires to use his feet only for propelling the machine. Each of the links is for this purpose provided with a rod $L^2$, fitted loosely into a tube $L^3$, and a locking-lever $L^4$, fulcrumed on the tube $L^3$, is adapted to engage a notch on the rod $L^2$, so as to fasten the rod and tube normally together, as shown in detail in Fig. 7. When it is desired to place the links in an inactive position, then the operator presses the lever $L^4$ to disengage it from the notch in the rod $L^2$, so that the rod is free to slide in the tube $L^3$ during the revolving of the corresponding crank-arm and no power is transmitted from the handle-bar N. The latter can now be used for steering purposes only.

In order to hold the lever $L^4$ in an innermost or outermost position, I provide a spring $L^5$, attached to the tube $L^3$ and having two notches for engagement with the said lever to hold the same in a locking or unlocking position.

The handle-bar N has its crank-arm N' integral therewith, while the other crank-arm $N^2$ is movable to permit of either holding the said crank-arms diametrically opposite each other for propelling purposes or for moving the crank-arms in alinement with each other, as indicated in dotted lines in Fig. 6. Then the handle-bar N is only used for steering purposes. The crank-arm $N^2$ is mounted loosely between two collars $N^3$ and $N^4$ on the handle-bar N, and a locking-lever $N^5$ is pivoted on the crank-arm $N^2$ and is adapted to engage teeth formed on the inside of the collar $N^3$, so that the crank-arm $N^2$ is locked to the said handle-bar in either of its two positions.

The outer end of the lever $N^5$ is pivotally connected with a rod $N^6$, extending through the hollow stud for carrying the grip, and a spring $N^7$ presses on the said rod $N^6$ to normally hold the lever $N^5$ in engagement with the corresponding teeth on the collar $N^3$. The outer end of the rod $N^6$ is provided with a knob $N^8$, projecting beyond the end of the grip, so that the operator can control it with the thumb of the hand with which he holds the grip to permit the operator to press the knob $N^8$ inward whenever it is desired to change the crank-arm $N^2$ from one position to another.

The members of the fork C are made hollow to form a receptacle or jar for an electric battery Q, used for furnishing electricity to an illuminating-lamp R for illuminating the path of the machine. An electric lamp R' extends rearwardly to form a danger-signal to prevent the rider from being run into, the battery also furnishing sufficient current for energizing an electromagnet S to actuate a brake T by moving the latter in contact with the rim of the wheel A. Another current leads to an electric bell U for sounding an alarm at crossings or the like.

The currents for the electric lights R R' are controlled by a switch $R^2$, arranged on the crank-arm N' of the handle-bar N so that the switch is under the control of the operator, and when thrown into an active position both lamps are lighted. Alongside the switch $R^2$ is arranged a push-button S' for controlling the current to the electromagnet S to allow the operator to apply the brake whenever necessary by the operator simply pressing the said push-button, it being understood that the armature of the electromagnet S then pulls on the pivoted brake T so as to move the same into engagement with the tire of the wheel. Next to the push-button S' is arranged a second push-button U' in the current for the electric bell U, so that when the operator presses the said push-button the bell U is sounded.

When it is desired to hold the bicycle in an upright position when at a standstill, I provide a support normally in an inactive position, as shown in full lines in Figs. 1 and 2, and this support is provided with a small wheel V, journaled in the lower end of a fork V', extending angularly from a rod $V^2$, fitted to slide in a transversely-extending and inclined casing $C^5$, forming part of the extension C'. The rod $V^2$ (see Fig. 8) is normally held in an uppermost position by a spring $V^3$, and the said rod is connected with one end of a rope, cord, or chain $V^4$, passing over pulleys $V^5 V^6$ into the hollow extension C' and along the same to the upper end thereof to finally wind on a drum W in front of the rider, the said drum being provided with a ratchet-wheel W', normally engaged by a pawl $W^2$ for locking the drum in place so as to hold the rod $V^2$ in an uppermost position against the tension of the spring $V^3$ by means of the said rope, cord, or chain $V^4$. Now when it is desired to use the support the operator moves the pawl $W^2$ out of mesh with the ratchet-wheel W' to allow the rope, cord, or chain $V^4$ to unwind, the spring $V^3$ forcing the rod $V^2$ outward to bring the wheel V finally in contact with the ground at one side of the machine, as indicated in dotted lines in Fig. 2. The machine is thus supported in an upright position while at a standstill. When it is again desired to move the support back to its normal inactive position, the operator turns the drum W by the use of a crank-arm or the like, so as to wind up the cord, rope, or chain $V^4$ and to pull the rod $V^2$ upward in the casing $C^5$ back to its former position, in which the several parts are locked by the pawl $W^2$ being thrown in mesh with the ratchet-wheel W'.

In the construction of the gear-wheels F and G, as well as the pinions E and H, it is desirable that the same be made as light as possible, and for this purpose I prefer to make the rims X of the said wheels of sheet metal, corrugated, as indicated in Figs. 9 and 10, to form teeth, the rims being set into correspondingly-shaped webs X' or rings $X^2$ to give the desired support to the wheels. The rings $X^2$ are provided with suitable spokes $X^3$, attached to the wheel-hubs. Now it will be seen that by this arrangement the machine is rendered comparatively light in its gearing, and at the same time the gearing can be cheaply manufactured.

Having thus fully described my invention, I claim as new and desire to secure by Letters Patent—

1. The combination with a drive-wheel, and a gear-wheel and a pinion revolving with the drive-wheel, of a driving-pinion in mesh with the said gear-wheel, a driving gear-wheel in mesh with the said pinion, a hollow crank-shaft on which the said driving-pinion and driving gear-wheel are mounted, the said crank-shaft carrying a crank-arm, a device extending within the said hollow shaft and along the crank-arm and adapted to connect either the said driving gear-wheel or the said driving-pinion to the said shaft the said device having a vertically-sliding portion, under the control of the operator, and means for locking said sliding portion in either its uppermost or lowermost position substantially as shown and described.

2. The combination with a drive-wheel having a gear-wheel and a pinion, of a driving-pinion in mesh with the said gear-wheel, a driving gear-wheel in mesh with the said pinion, a crank-shaft on which the said driving gear-wheel and driving-pinion are loosely mounted, a lever fulcrumed to the crank-shaft and extending beyond the outer end thereof, the said lever being constructed to engage either the driving-pinion or the driving gear-wheel to connect the same to the shaft, a rod loosely connected with the outer end of the lever and extending along the crank-arm, and arranged when actuated to impart a swinging motion to the lever in one direction, a spring for moving the lever in the opposite direction, and means whereby the lever is locked in either of said positions, substantially as described.

3. The combination with a drive-wheel, and a hollow crank-shaft, of sets of driving connections between the said crank-shaft and drive-wheels for high and low speed, a lever for locking the crank-shaft to either of said sets of driving connections, the said lever being fulcrumed within the hollow crank-shaft and extending beyond the outer end thereof, a crank-arm normally locked to the crank-shaft, but adapted to be unlocked therefrom, and a rod loosely connected with the outer end of the said lever and arranged when actuated to impart a swinging motion to the lever, the said rod extending along the crank-arm and adapted to turn on the outer end of the lever when the crank-arm is unlocked from the crank-shaft, as and for the purpose set forth.

4. The combination with a drive-wheel having internal gear-wheels on its hub and pinions on the ends of its axle, of driving-pinions in mesh with the said gear-wheels and driving gear-wheels in mesh with the said pinions, hollow crank-shafts on which the said driving gear-wheels and driving-pinions are loosely mounted, the crank-shafts being each provided with a crank-arm, a lever located within each of the said hollow shafts and fulcrumed therein, the said levers being each formed with projecting lugs adapted to engage recesses formed in the corresponding driving-pinion and driving-gear, a spring normally holding each of said levers in engagement with one of said driving devices, each of said levers extending slightly beyond the outer end of the corresponding hollow shaft, rods loosely connected with the outer ends of the levers and extending downward along the crank-arms, a slide with which each rod is connected, the said slides being adapted to be engaged by the operator to move the levers against the tension of their springs, and spring-catches adapted to hold the slides in either their uppermost or lowermost position, substantially as shown and described.

5. The combination with a drive-wheel, a gear-wheel and a pinion secured on the said drive-wheel, of a driving-pinion in mesh with the said gear-wheel, a driving gear-wheel in mesh with the said pinion, a crank-shaft adapted to be locked to either the said driving-pinion or the said driving gear-wheel, a crank-arm on the said crank-shaft, a sliding bolt on the said crank-arm adapted to engage the shaft to normally lock the arm to the shaft, and a slide connected with the said bolt and adapted to be engaged by the operator to move the bolt out of engagement with the shaft, substantially as shown and described.

6. In a bicycle-driving device a handle-bar comprising a shaft, a crank-arm formed on one end of the said shaft, a second crank-arm mounted loosely between two collars on the other end of the shaft and a lever for locking the said second arm to the shaft, either in or out of alinement with the other crank-arm, substantially as shown and described.

7. In a bicycle-driving device a handle-bar comprising a shaft, a crank-arm formed on one end of said shaft, a second crank-arm mounted loosely on the other end of the shaft, a lever for locking the said second arm to the shaft either in or out of alinement with the other crank-arm, and a spring-pressed rod connected with the said lever, substantially as described.

8. In a bicycle-driving device a handle-bar comprising a shaft, a crank-arm formed on one end of the said shaft, a second crank-arm mounted loosely between two collars on the other end of the shaft, one of said collars being formed with teeth, a locking-lever pivoted on the loosely-mounted crank-arm and adapted to engage the said teeth and a spring-pressed rod connected with the said lever and extending through the hollow stud carrying the grip, substantially as set forth.

9. A bicycle provided with pedal or crank arms for connection with the drive-gear, a handle-bar mounted to turn and provided with crank-arms, links connecting the corresponding pedal-arms and handle-bar crank-arms with each other, each link comprising a tube and a rod fitted loosely in the tube, a locking-lever fulcrumed on the tube and adapted to engage a notch on the rod to fasten the rod and tube normally together and a spring-catch attached to the tube and provided with two notches for engagement with the outer end of the lever to hold the same in a locking or unlocking position, substantially as described.

JOHN CARLYLE RAYMOND.

Witnesses:
THEO. G. HOSTER,
E. B. MARSHALL.